Patented Jan. 6, 1925.

1,521,918

UNITED STATES PATENT OFFICE.

WALTER EDWIN TRENT, OF WASHINGTON, DISTRICT OF COLUMBIA, ASSIGNOR TO TRENT PROCESS CORPORATION, OF WASHINGTON, DISTRICT OF COLUMBIA, A CORPORATION OF DELAWARE.

FUEL SUBSTANCE AND PROCESS OF PRODUCING THE SAME.

No Drawing.   Application filed February 2, 1921.   Serial No. 441,806.

*To all whom it may concern:*

Be it known that I, WALTER E. TRENT, a citizen of the United States, residing at Washington, in the District of Columbia, have invented certain new and useful Improvements in Fuel Substances and Processes of Producing the Same, of which the following is a specification.

It is an object of the invention to provide a fuel substance containing finely comminuted carbon, oil, and a percentage of water formed into a homogeneous mass of a pasty or non-fluid consistency.

I have discovered that water can be incorporated with oil and finely pulverized coal into a homogeneous mass of a semi-solid consistency, which is stable under ordinary conditions of temperature and pressure, if certain definite quantities of the water and oil are commingled with a definite proportion of comminuted coal or carbon. There is considerable range in the relative quantity of water that can be incorporated into this semi-solid or non-fluid mass, the greatest amount being approximately 56% of the total mixture, which occurs when the coal is substantially 40% and the oil substantially 4% of the entire mass.

This produces an ideal substance for the manufacture of carburetted water gas, as the three materials are in the proper proportions, and only require the application of necessary heat.

Any smaller percentage of water can be incorporated with the mass when using the same relative amounts of oil and coal, and when less water is used, then of course more oil may be included in the non-fluid composite substance. When oil in excess of the 4% hereinbefore mentioned is mixed with the mass it becomes incorporated therewith, but it releases and expels water so that when the oil content approximates 30% of the mass, the water content has been reduced to about 10% of the mass. If more oil than 30% is used, the mass loses its desired non-fluid or semi-solid consistency, and becomes more or less liquid and less stable.

There are different uses for mixtures that vary in water content, and as an illustration, a substance containing from 10% to 20% water is desirable when the mass is to be distilled for the removal of oil and the recovery of the by-product oils of the coal, because when the water and oil are so filmed and completely mixed the oils can be distilled from the mixture at lower temperatures than when distilled alone.

Another use for a semi-solid substance of this character containing 5% to 10% water is the employment of the substance for coal gas retorts or for coke making, because much of this water as steam comes in contact with the hot carbon thereby resulting in the formation of water gas at the same time the coal gas is being made.

It will be understood that the present product consists of a semi-solid stable mixture which always contains a quantity of oil, water and comminuted carbon. The quantities of oil and water may vary, but I have found that the quantity of water should not substantially exceed 56% of the entire mass, as otherwise the substance will become more or less liquid and not a stable product, but of course any percentage of water under 56% may be employed in keeping with the use for which the substance is intended.

In forming the substance, and assuming that a product is to be made containing a substantial maximum percentage of water, I take about 56 parts of water and mix it with 40 parts of pulverized coal which may be bituminous, anthracite, lignites, or other coals of approximately 100 mesh and thoroughly agitate the two substances, which are then in a liquid or free flowing state. I then add approximately 4 parts of navy fuel oil or a like petroleum oil and thoroughly agitate the same until the entire mass assumes a semi-solid consistency in which the various components are uniformly distributed throughout the mass. This mass is usually of the consistency of thick mortar, and as will be appreciated contains a material percentage of water, sufficient, without the application of oil and the agitation above described, to assume with the coal a liquid state. However, the addition of the oil serves to cause both the water and the oil to incorporate with the coal in to a non-fluid homogeneous mass of a non-fluid and stable nature.

If a substance is desirable which should contain a smaller percentage of water, then of course the coal can be mixed with any percentage of water under substantially 56%, and then the oil added, which may be in excess of 4%. This mixture is then agitated and the homogeneous non-fluid mass results containing the selected percentage of water and oil.

It is also possible to govern the percentage of water in the mass by varying the quantity of oil employed, it being understood that if the coal is mixed with any desired quantity of water or even placed in suspension in water, and a quantity of oil approximating 30% of the mass is added and the substance agitated the oil will incorporate with the mass and serve to release or displace water so that when this proportion of oil is used the mass will contain only substantially 10% water content, as the remaining water has been displaced by the oil. Variable quantities of oil will result in a variable water content and this of course can be controlled, depending upon the character of substance desired.

Having thus described the invention, what I claim is:

1. A fuel composition consisting of finely divided coal, water and petroleum oil, intermixed in the proportion of substantially 56 parts water, 40 parts coal, and 4 parts oil, in a homogeneous mass of a non-fluid consistency.

2. The process of producing a fuel substance, which consists in commingling a carbonaceous mineral fuel, water and petroleum oil in the proportion of substantially 56 parts water, 40 parts carbonaceous mineral fuel, and 4 parts oil to form a homogeneous mixture of the three substances in a mass of a semi-solid consistency.

3. A fuel composition, consisting of a finely divided carbonaceous mineral fuel, water and petroleum oil, thoroughly intermixed in a homogeneous mass of a semi-solid consistency, the maximum percentage of water contained in said mass being substantially 56% of the entire content thereof.

4. An artificial fuel consisting of finely divided coal, water and petroleum oil, said fuel containing a petroleum oil content ranging from 4% to 30% of the mass, with an applied water content not exceeding 56% of the mass, and a minimum coal content of 40% of the fuel mixture.

5. An artificial fuel composed of finely pulverized coal mixed with substantial quantities of petroleum oil and water and forming a homogeneous mass of a plastic consistency, the petroleum oil contained in the mass ranging from 4% to 30% thereof, with an applied water content ranging from 5% to 56%.

In testimony whereof I affix my signature.

WALTER EDWIN TRENT.